United States Patent [19]
Norton et al.

[11] Patent Number: 4,903,402
[45] Date of Patent: Feb. 27, 1990

[54] METHOD OF ASSEMBLING A CONNECTOR TO A CIRCUIT CARD

[75] Inventors: Jeffrey M. Norton, Lebanon; Edward J. Paukovits Jr., Hershey; William J. Rudy Jr., Annville; Howard R. Shaffer, Millersburg, all of Pa.

[73] Assignee: AMP Incorporated, Harrisburg, Pa.

[21] Appl. No.: 351,280

[22] Filed: May 4, 1989

Related U.S. Application Data

[60] Continuation of Ser. No. 213,577, Jun. 30, 1988, abandoned, which is a division of Ser. No. 78,944, Jul. 28, 1987, abandoned and continued as Ser. No. 218,509, Jul. 5, 1988 now Pat. No. 4,808,115.

[51] Int. Cl.$^4$ .......................................... H01R 23/70
[52] U.S. Cl. ........................................ 29/843; 439/79
[58] Field of Search .................... 439/55, 59–65, 439/76, 79, 80, 246–248, 271–277, 607–609; 361/388, 399, 413; 29/837–845

[56] References Cited

U.S. PATENT DOCUMENTS

| | | | |
|---|---|---|---|
| 3,267,333 | 8/1966 | Schultz | 439/76 |
| 3,404,367 | 10/1968 | Henschen | 339/217 |
| 3,413,594 | 11/1968 | Fernald et al. | 339/176 |
| 3,474,521 | 10/1969 | Schwenn | 29/471.3 |
| 3,634,816 | 1/1972 | Zell | 339/186 M |
| 3,651,444 | 3/1972 | Desso et al. | 339/42 |
| 3,678,441 | 7/1972 | Upstone et al. | 439/272 |
| 4,021,095 | 5/1977 | Kinkaid et al. | 206/330 |
| 4,241,381 | 12/1980 | Cobaugh et al. | 361/413 |
| 4,392,705 | 7/1983 | Andrews, Jr. et al. | 339/75 MP |
| 4,418,972 | 12/1983 | Benasutti | 339/14 R |
| 4,502,601 | 3/1985 | Husted et al. | 211/41 |
| 4,505,035 | 3/1985 | Burton et al. | 29/843 |
| 4,571,012 | 2/1986 | Bassler et al. | 339/14 R |
| 4,583,807 | 4/1986 | Kaufman et al. | 439/83 |
| 4,639,056 | 1/1987 | Lindeman et al. | 339/17 LC |
| 4,647,130 | 3/1987 | Blair et al. | 339/64 M |
| 4,684,192 | 8/1987 | Long et al. | 439/374 |
| 4,689,721 | 8/1987 | Damerow et al. | 361/388 |
| 4,710,133 | 12/1987 | Lindeman et al. | 439/92 |
| 4,715,829 | 12/1987 | Preputnick | 439/660 |
| 4,737,115 | 4/1988 | Seidler | 439/83 |
| 4,739,550 | 4/1988 | Schaeffer et al. | 29/741 |

FOREIGN PATENT DOCUMENTS 2254928 7/1975 France.

OTHER PUBLICATIONS

AMP Catalog No. 81-655, "AMP-HDI 2-Piece PC Board Connectors", Rev. 3, AMP Incorporated, Harrisburg, PA. pp. 1-2, 12-15, 38, 39, 43.
AMP Catalog No. 76-362, "AMP Metrimate Pin and Socket Connectors", Rev. 9-83, AMP Incorporated, Harrisburg, Pa., cover Page & pp. 34-37.
IERC-ZIF, Circuit Board Retainers.
Calmark-Series 225-"Card-Lok" Retainer (Coldplate).
IERC-Military Packaging Products, 1987.

*Primary Examiner*—Neil Abrams
*Attorney, Agent, or Firm*—Anton P. Ness

[57] ABSTRACT

An LRM connector is joined to printed circuit boards and secured to cover plates of the LRM at an end thereof to be mated with mother board connector mounted within a black box. The LRM connector is float mounted within cover plates on said LRM and aligns itself with the mother board connector when the LRM is inserted into the black box while maintaining sealing engagement with the cover plates. A metal shroud of the LRM connector provides EMI shielding and engagement with the metal shroud of the mother board connector even if the two metal shrouds are slightly misaligned with respect to each other. A method for assembly includes forming separate contact subassemblies having dielectric material molded around body sections; rearward contact sections on free ends of elongated cantilever beams remain joined to carrier strips until being soldered to conductive pads of the VHSIC circuit cards; then the carrier strips are broken off.

11 Claims, 12 Drawing Sheets

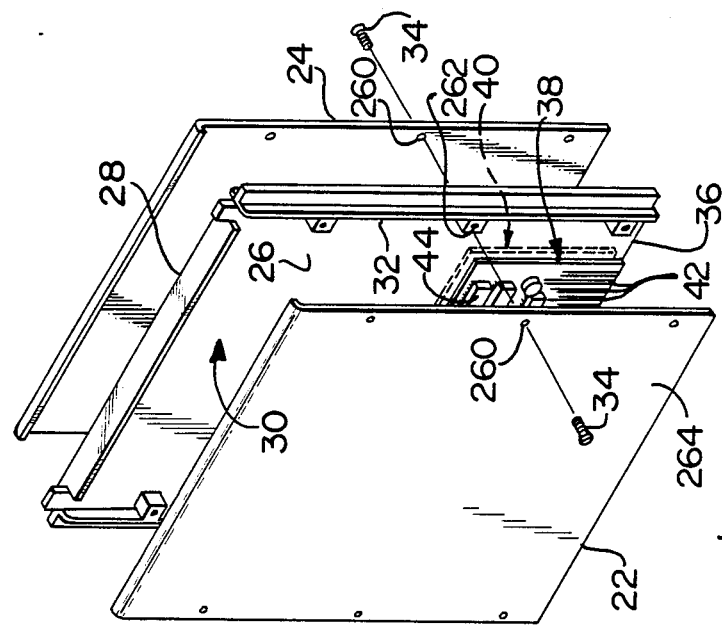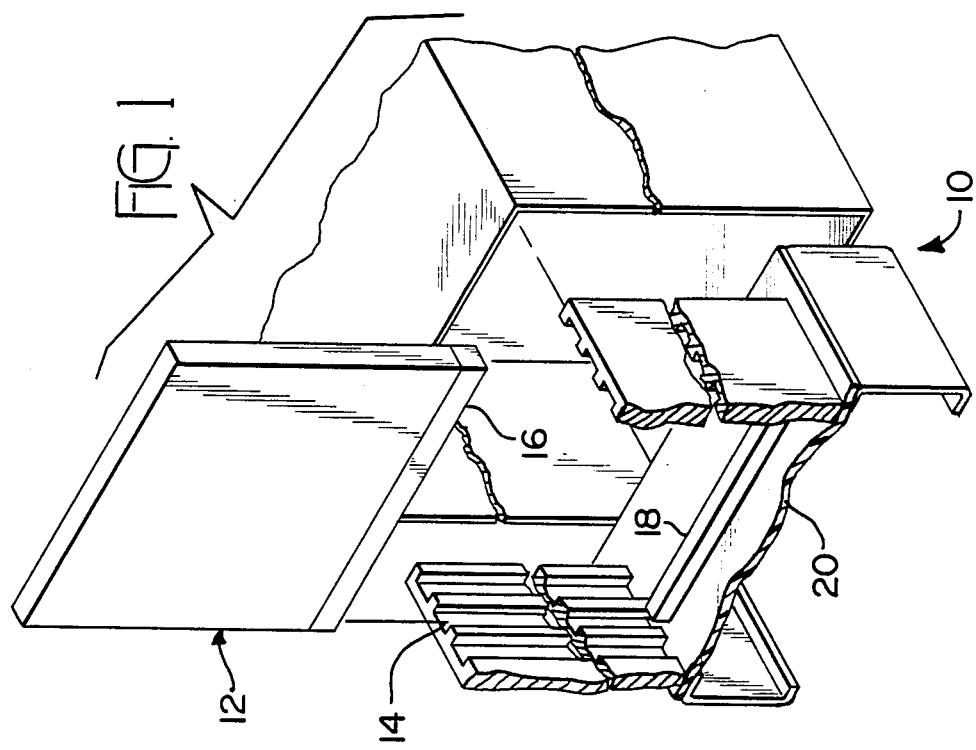

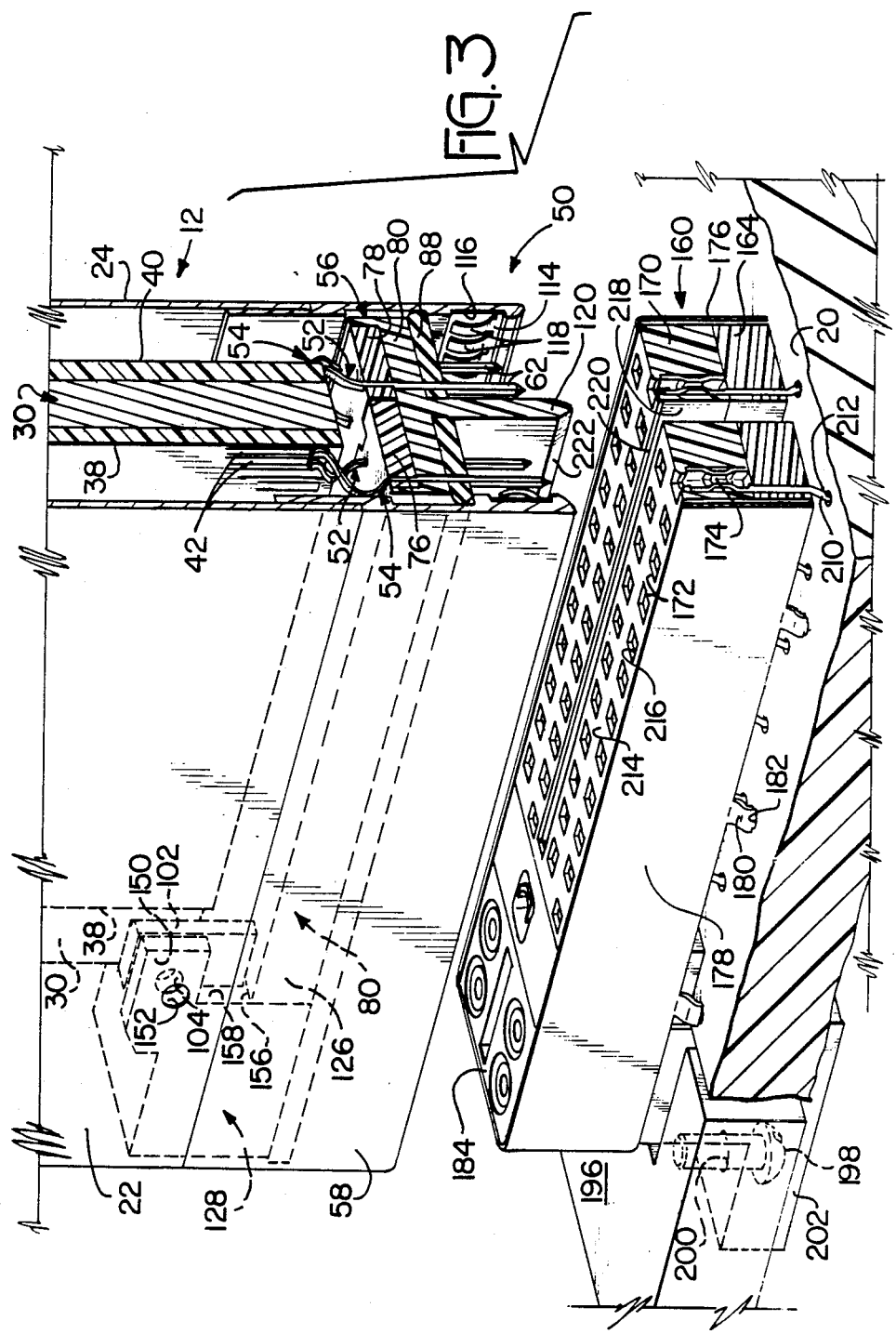

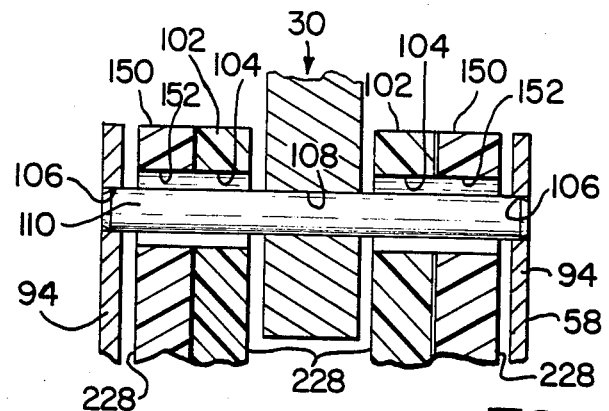
FIG. 3a
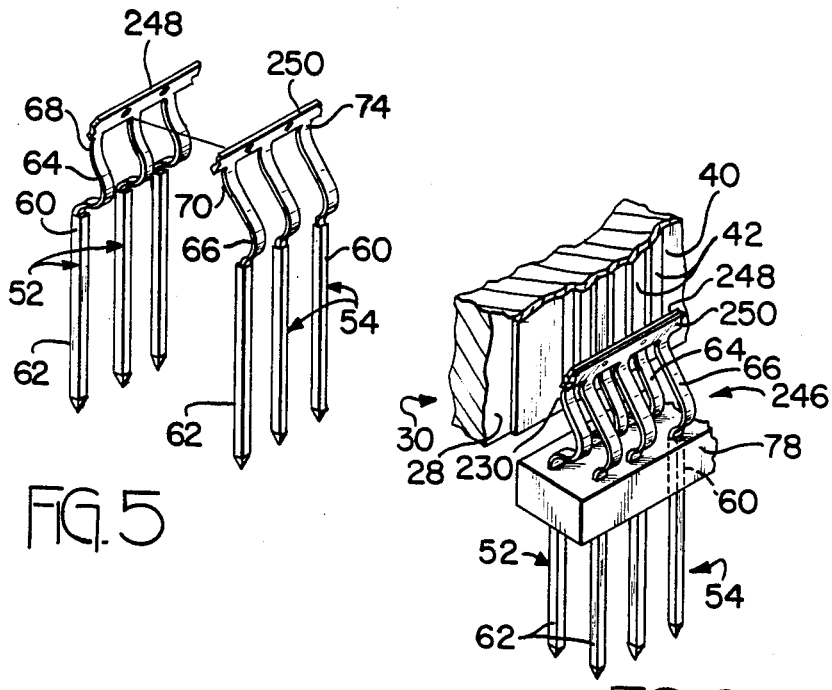
FIG. 5
FIG. 6

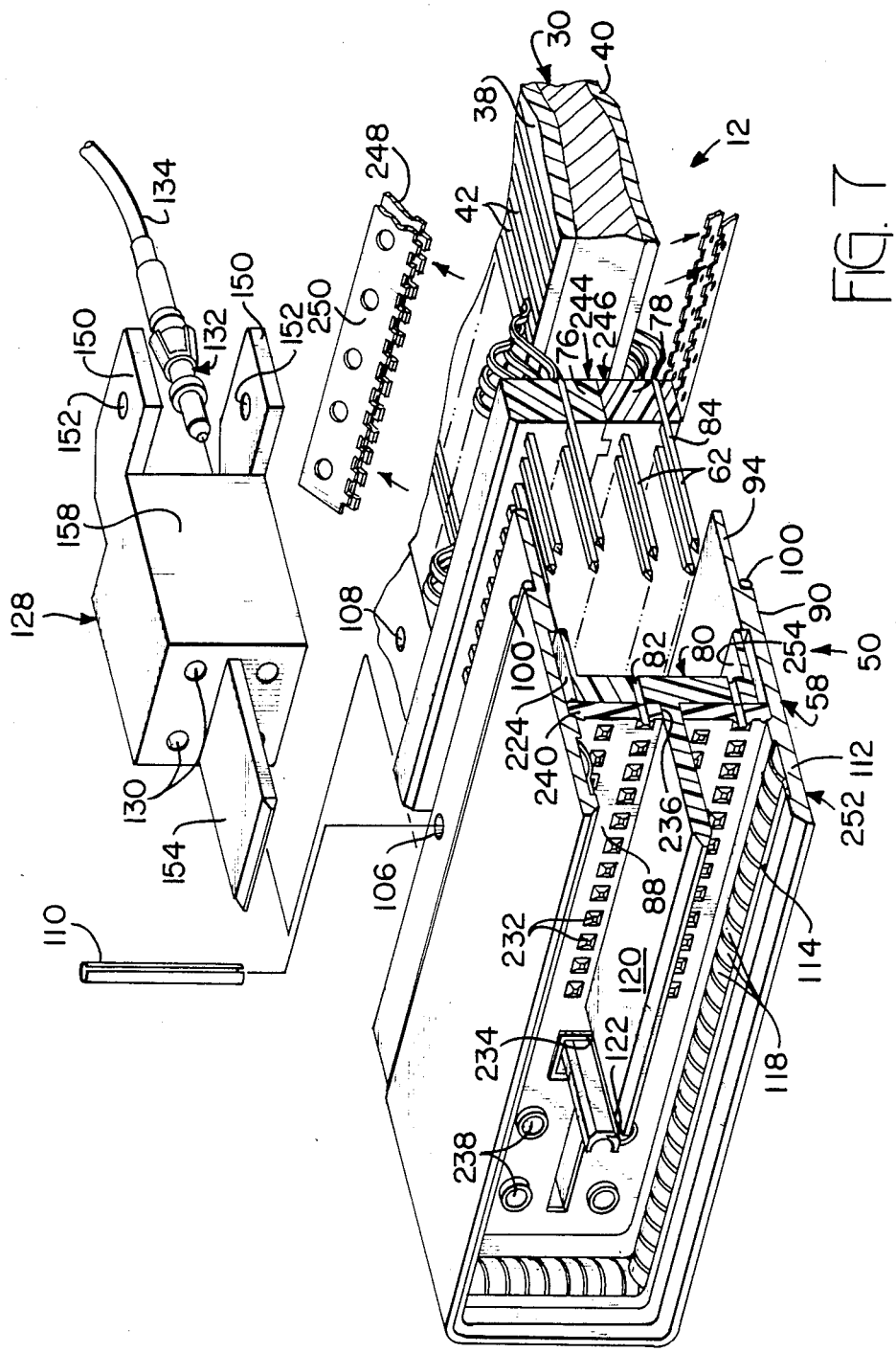

METHOD OF ASSEMBLING A CONNECTOR TO A CIRCUIT CARD

This application is a continuation of application Ser. No. 213,577, filed June 30, 1988, now abandoned, which was a divisional of application Ser. No. 078,944 filed July 28, 1987, now abandoned, and continued as application Ser. No. 218,509 filed July 5, 1988, now U.S. Pat. No. 4,808,115.

FIELD OF THE INVENTION

The present invention relates to the field of electrical connectors, and more particularly to connectors for interconnecting a line replaceable module (LRM) to a mother circuit panel.

BACKGROUND OF THE INVENTION

Especially in the aircraft industry, it is becoming desirable that electronic control units, or "black boxes," each comprise a housing containing essentially a single circuit panel or mother board to which are electrically connectable a plurality of line replaceable modules on one surface and shipboard electrical systems on the other. Each line replaceable module, or LRM, performs a control or sensing or recording function and is itself essentially a circuit card or daughter board loaded with various electrical and electronic components. Such circuit card of choice evolves from very high speed integrated circuitry, or VHSIC, technology and is intended to be secured within a very durable, rugged, environmentally sealed metal housing. Therefore, for such a loaded circuit card to be contained entirely within a sealed housing an electrical connector is necessary to provide a means for electrically interfacing with a corresponding electrical connector mounted on the mother board. Such a daughter board connector must be secured to an edge of the daughter board (or plurality of daughter boards) at an end of the housing, and must itself be environmentally sealed about its electrical contacts and about its peripheral joint with the LRM housing. To be compatible with a densely packed VHSIC card or cards such a connector must have an array of contacts whose contact sections are engageable with closely spaced circuit paths of the cards, such as paths on 0.025 inch centerlines along an edge of the panel.

Such a high density connector for circuit paths spaced 0.050 or 0.025 inches apart is disclosed in U.S. patent application Ser. No. 06/930,587 U.S. Pat. No. 4,715,829 wherein an array of contact terminals have long arcuate cantilever beam contact sections which are engaged with and electrically connected to the circuit paths of a panel. The terminals are secured in respective passageways of one of the connector housing modules and include box receptacle contact sections within portions of the passageways extending inwardly from a mating face for mating with corresponding pin contact sections of a mating connector. The housing includes a metal shell therearound for physical protection of the housing modules and also for protection from electromagnetic interference (EMI). The connector assembly is adapted to be mounted to a metal plate or heat sink on both sides of which are secured circuit cards bonded thereto by known heat conductive, heat resistant adhesive material, and which is inserted between pairs of mounting ears at opposite ends of the connector assembly; roll pins are then inserted through aligned bushings in each pair of ears and through the heat sink in a manner which allows the heat sink to float incrementally. While the cantilever contact beams of the first connector are arranged in two opposed rows and are spaced at 0.050 or 0.025 inches to correspond to the circuit path spacing on the surface of a respective circuit card, the box receptacle contact sections of the terminals are arranged in staggered fashion in four rows to accommodate the size of the box receptacle contact sections; the box receptacle contact section is disclosed in U.S. Pat. No. 3,404,367. The mating connector includes pin contact terminals which have pin contact sections extending outwardly from one face of a housing within a metal shroud of the connector and are matable with the respective box receptacle contact sections of the first connector. The pin contact terminals have pin contact sections extending outwardly from the connector housing on the other side, to be inserted into holes of a printed circuit board or the like and electrically connected thereto, which holes may have a different pattern and spacing than the pattern and spacing of the contact sections of the mating pairs of terminals of the mating connectors. The mating connectors also have keying and polarizing features.

It is desirable to provide a mating connector assembly for electrically interconnecting circuit cards having circuit paths on 0.025 inch centerlines, to a mother board having circuit means on like or different spacing and pattern.

It is also desirable to provide a connector for an LRM which is firmly secured thereto in a manner which includes means for sealing engagement between the dielectric housing means of the connector and the metal cover means thereof, where the housing means is adapted to float incrementally therewithin in a transverse direction with respect to the connector mating face.

It is further desirable to provide such an LRM connector with means to seal environmentally around the contact sections of its terminals which are exposed to be electrically engaged by corresponding contact sections of terminals of a mating connector.

It is further desirable to provide means for aligning the LRM connector incrementally into an accurate orientation with respect to the mating connector fixed in position on a mother board for the arrays of corresponding pairs of contact sections of the two connectors to mate, while the LRM itself is not incrementally alignable.

It is yet further desirable for the connector assembly to provide means for transmitting electrical power from a power source into the LRM to provide power, for instance, to components assembled to the circuit cards within the LRM assembly, to provide means for coaxial signal transmission, and to provide means for transmitting optical signals into and out from the LRM assembly.

It is still further desirable to provide a mother board connector assembly matable with the LRM connector and providing for power, coaxial signal and optical signal interconnection with the LRM assembly, and which includes a metal shroud therearound grounded to the mother board and together with appropriate grounding engagement with the metal housing of the LRM assembly provides EMI and ESD shielding of the entire interconnection between the LRM assembly with the mother board connector.

It is desirable to provide a method for securing contact sections of an LRM connector to surface contact sections of VHSIC circuit cards within the LRM assembly on close spacing such as on centers spaced 0.025 inches apart, without requiring tooling for alignment of the contact sections of the connector individually with the corresponding circuit card contact sections prior to joining the corresponding contact sections together in a secure mechanical and electrical connection.

It is also desirable, within both the interior of the LRM assembly and the interior of a corresponding black box into which it is to be removably inserted for in-service use, to provide for power, coaxial and optical fiber cable means to extend from the LRM connector assembly and mother board connector assembly respectively.

SUMMARY OF THE INVENTION

The present invention includes an LRM connector having rows of terminals for engaging the closely spaced circuit paths of VHSIC circuit cards on side surfaces of the end of heat sink means in the LRM, and providing electrical connection thereof to corresponding circuits of a mother board within a black box by way of a mating connector secured on the mother board. Because the mother board and its connectors are rigidly secured in the black box, and each LRM assembly is inserted into the black box along guide channels which are fixed in position in the black box, the LRM connector and its manner of mounting to the LRM permit incremental movement in a transverse direction with respect to the LRM while remaining in a sealed relationship therewith, to be forgiving of being initially incrementally offset with respect to the mating mother board connector. The LRM connector includes an alignment rib extending forwardly of the mating face which enters a corresponding alignment channel of the mating connector and urges the LRM connector incrementally laterally into an aligned orientation during mating, so that the corresponding pairs of terminals of the connectors are thereby properly aligned with each other to engage and mate. A seal member is disposed across the mating face of the LRM connector which seals about the pin terminal contact sections extending forwardly of the dielectric housing to mate with box receptacle contact sections of the mother board connector. The seal member also seals with the inside surface of the metal cover of the LRM assembly at the seal member periphery, and being made of an elastically deformable material the seal maintains the sealing engagement when the connector is urged incrementally to the side during connector alignment during mating.

In another aspect of the present invention, the terminals of the LRM connector are maintained in carrier strip form as the contact sections are secured to the circuit paths of the circuit card. Retaining the carrier strips attached to the free ends of the long cantilever beams maintains the terminal ends precisely spaced 0.025 inches apart until the contact sections at the free ends are soldered or otherwise secured to the circuit paths. Prior to the terminals being secured to the circuit cards, the terminals have dielectric insert bodies molded around body sections thereof at the other end of the long cantilever beams, forming a terminal subassembly. After joining the contact sections to the circuit paths, the carrier strips joined at the terminal ends are now removed such as by severing or by breaking of frangible links. Terminal subassemblies thus secured to the mounted circuit cards then receive the remainder of the LRM connector, which is then assembled securely to the heat sink and cover means of the LRM.

In the present invention two rows of terminals are dedicated to each of the one-sided VHSIC circuit cards, with the terminal ends of both rows arrayed in a common row at the contact sections adjacent the card, best done by stamping and forming two carrier strips of terminals on 0.050 inch centerlines, each strip having its long cantilever beams formed slightly differently to result in inner and outer rows of pin contact sections at the other ends of the terminals. Each array of two rows has a separate insert molded to the terminals thereof, thus defining two terminal subassemblies, one for each one-sided circuit card, whether the circuit cards are mounted on opposed sides of a central metal heat sink plate between two outer cover plates as in a first embodiment, or on inner surfaces of metal plates comprising the covers and heat sink means as in the second embodiment. The carrier strips of the two rows of terminals of each array are disposed adjacent each other in the terminal subassemblies, and optionally may be welded together.

In a second embodiment of the LRM connector, a pair of two row terminal subassemblies is prepared as before, with carrier strips attached to free ends of the cantilever beams. The LRM is modified to eliminate the central metal heat sink plate and to place the VHSIC cards directly on inside surfaces of the outer cover members, significantly enhancing heat dissipation and allowing for thicker cover plates for better physical protection of the LRM assembly while actually enabling a reduction in overall weight. The contact sections of each terminal subassembly are secured to the circuit cards as before, and the carrier strips removed. The forward connector subassembly of the previous embodiment may now comprise two halves joined along an abutting seam, each half secured to a respective cover plate so that a pair of cover plate/connector units are thus defined securable together by mechanical fasteners. The forward ends of the cover plate members can define the connector shroud, each with an EMI spring strip. An O-ring seal is placed within grooves around the peripheral facing edges of the two plates for effective sealing. Thus the two units can be separated for repair or even for replacement of one of the units while allowing reuse of the other unit. An additional advantage of this embodiment is that spring contact arms can be selectively secured to circuit paths of one circuit card which will engage and electrically connect with opposing spring contact arms secured to the other card, to directly interconnect paths of the two cards upon assembly of the pair of units.

It is an objective of the present invention to provide a pair of mating connectors to interconnect an LRM assembly to a mother board within a black box.

It is another objective to provide an LRM connector electrically connectable to a VHSIC circuit card within an LRM assembly whose circuit paths have centerlines spaced 0.025 inches apart.

It is still another objective to provide such a sealed LRM connector which is capable of incremental transverse movement with respect to the LRM assembly to self-align with the mother board connector upon mating, for proper alignment of their terminals.

It is an objective of the present invention to provide an improved method of electrically connecting the terminals of an LRM connector to respective circuit paths of a VHSIC circuit card already secured to a metal heat sink plate without expensive alignment tooling in an intricate assembly step.

It is an additional objective of the present invention to provide an improved LRM assembly which eliminates the central heat sink member while facilitating heat dissipation characteristics of the assembly, facilitates assembly of the connector thereto, provides for direct interconnection between circuit cards within the assembly, provides a single central space within the assembly for containing components of substantial height and for cable lengths, provides for thicker cover plates resulting in greater physical protection for the assembly while not increasing the weight of the assembly, and provides for assured sealing between the cover plates and improved EMI shielding by eliminating the separate LRM connector shroud.

BRIEF DESCRIPTION OF THE DRAWINGS

FIG. 1 illustrates a black box adapted to receive a plurality of LRM's along guide channels, one of which is exploded therefrom.

FIG. 2 is a perspective exploded view of a first embodiment of an LRM without a connector mounted thereto.

FIG. 3 is an enlarged perspective longitudinal section view of a first embodiment of an LRM connector of the present invention secured to circuit cards of the LRM of FIG. 2 with the housing and insert in phantom and positioned to mate with a mother board connector secured to a mother board of a black box of FIG. 1.

FIG. 3A is an enlarged view of the arrangement for mounting the LRM connector to the heat sink plate of the LRM of FIGS. 2 and 3.

FIGS. 5, 6 and 7 are perspective views showing the forming of the terminal subassemblies and the securing of the forward connector subassembly to the terminal subassemblies soldered to the circuit cards in a first embodiment.

DETAILED DESCRIPTION OF THE PREFERRED EMBODIMENTS

Figure 4:
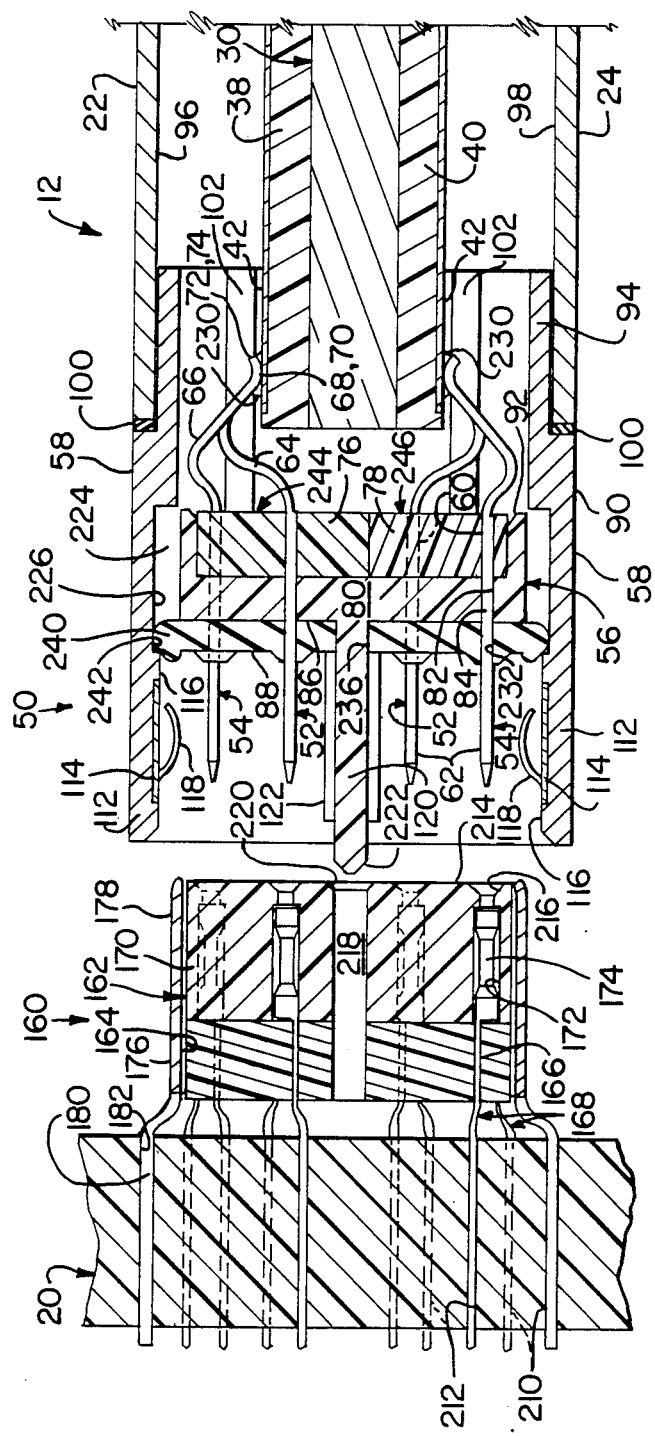
FIG. 4 is an enlarged longitudinal section view through the pin terminal array of the LRM connector and mother board connector of FIG. 3 aligned for mating.

FIG. 1 generally illustrates a black box 10 comprising one of a plurality of electronic control units for aircraft and the like, with a representative line replaceable module, or LRM, assembly 12 which is insertable thereinto along with like others. LRM assembly 12 is inserted along guide channels 14 so that an LRM connector 16 secured at the front end thereof mates with a corresponding electrical connector 18 mounted on a mother circuit panel 20 such as a printed circuit board to be thereby interconnected to shipboard electrical systems. LRM assembly 12, as shown in FIG. 2 and under consideration by the industry, is comprised of a pair of metal cover plates 22,24 to be secured along both sides 26,28 of a centrally disposed metal heat sink plate 30, by being fastened within peripheral flange 32 of the heat sink plate by a plurality of fasteners 34 such as bolts or rivets. On side surfaces 26,28 of heat sink 30 at a front end 36 are mounted respective one-sided circuit cards 38,40. Preferably the cover plates and heat sink are anodized aluminum.

Circuit cards 38,40 such as VHSIC cards have an array of parallel circuit paths 42 each 0.010 to 0.015 inches wide on 0.025 inch centerlines extending rearwardly from a leading edge at the forward end of the LRM cover plates. To the circuit cards are mounted and electrically connected various electronic and electrical components 44 as desired, and also electrical components such as light emitting and light receiving diodes for optical fiber connection, coaxial or triaxial connectors and power terminal means, if desired. If such optional electrical components are utilized, the LRM assembly must also include cable means extending from appropriate connection with the components to the forward end of the LRM cover plates. Sufficient space must be created between the cover plates and the heat sink to accommodate the various components and cable means and also allow for terminals to be secured to circuit paths 42 of the circuit cards. At the forward end of the LRM assembly will be assembled an LRM connector, as shown in FIGS. 3 and 4, which includes terminals for electrical connection to circuit paths 42, and which also provides for terminals for the various optional optical fiber lines, coaxial or triaxial signal lines, and power lines.

With reference to the embodiment of FIGS. 3 and 4, LRM connector 50 is comprised of a plurality of contact terminals 52,54 which are secured within a housing means 56, and surrounding LRM connector 50 is an integral metal shroud 58. Terminals 52,54 have body sections 60, pin contact sections 62 forwardly thereof, and elongate arcuate cantilever beams 64,66 at their rearward ends having contact sections 68,70 at free ends 72,74 thereof for electrical connection to respective circuit paths 42 of circuit cards 38,40. Preferably housing means 56 consists of rearward blocks 76,78 molded around terminal body sections 60, and a premolded forward housing member 80 having a plurality of passageways 82 therethrough, through which rearward ends 84 of pin contact sections 62 will extend after assembly. Forwardly of mating face 86 of forward housing 80 is an integral seal member 88.

Metal shroud 58 includes a rear section 90 extending rearwardly of rear face 92 of LRM connector 50 where a flange 94 of the shroud extends farther rearwardly. After complete assembly of the LRM, flange 94 will extend along inner surfaces 96,98 of LRM cover plates 22,24 and be sealed thereto such as by a bead 100 of silicone rubber sealant (FIG. 4) or by conductive epoxy material. Forward housing 80 may also include several pairs of mounting ears 102 extending rearwardly therefrom alongside heat sink plate surfaces 26,28 at locations spaced laterally from all circuit cards 38,40 assembled to heat sink plate 30. With reference to FIG. 3A, extending through mounting ears 102 and flange 94 of metal shroud 58 outside thereof preferably are aligned holes 104,106 which further align with corresponding holes 108 in heat sink plate 30 through all of which may be placed roll pins 110, similarly to the arrangement described in U.S. Pat. No. 4,715,829 assigned to the assignee hereof. Roll pins 110 extending through mounting ears 102 provide a stop mechanism preventing axial movement of not only metal shroud 58 but also forward housing 80.

Metal shroud 58 is preferably made of electroless nickel plated aluminum and has a forward section 112 extending forwardly of mating face 86 of forward housing 80 and seal member 88 to extend beyond pin contact sections 62 of terminals 52,54 for physical protection thereof and for EMI protection of the interconnections thereof with contact sections of the mother board connector after mating of the connectors upon insertion of the LRM assembly into the black box. Preferably metal shroud forward section 112 includes an EMI spring strip 114 secured peripherally around the inside surface 116 thereof having a plurality of convex spring fingers 118 extending rearwardly and inwardly, forward of seal member 88. Such an EMI spring strip may be stamped and formed of nickel plated beryllium copper alloy.

Forward housing 80 is molded of heat resistant polyphenylene sulfide and includes an alignment rib 120 which extends farther forwardly than metal shroud forward section 112 and pin contact sections 62, in order to enter a corresponding alignment recess 218 of mother board connector 160 to align LRM connector 50 therewith. Preferably, stainless steel keys 122 are secured, as in FIG. 1, in key passageways 124 of key sections 126 of forward housing 80 at ends of the array of pin contact sections 62 to provide keying in cooperation with corresponding keys in mother board connector 160 (FIG. 4), to prevent mating of LRM connector 50 unintentionally with the incorrect mother board connector when LRM assembly 12 is inserted into an incorrect channel of black box 10. A preferred method of retention of a key in a housing is disclosed in U.S. patent application Ser. No. 07/042,495 assigned to the assignee hereof.

Figure 8:
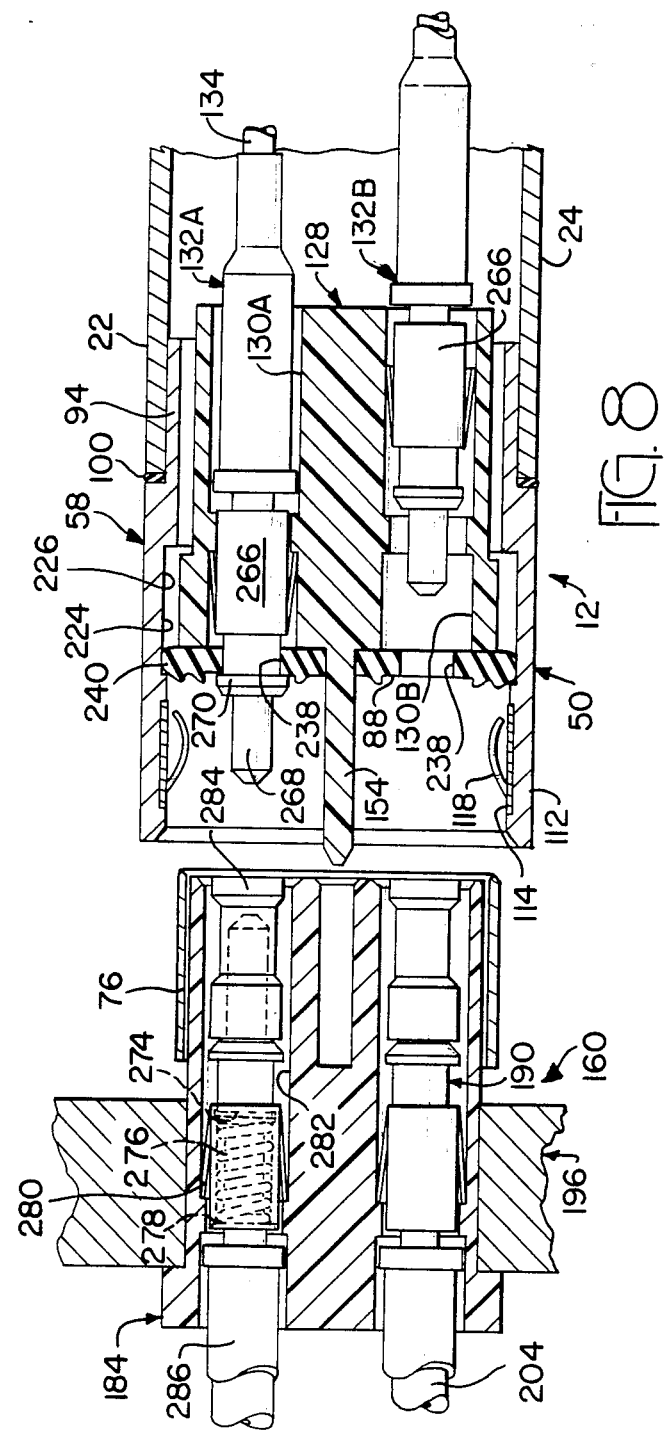
FIGS. 8 and 9 are longitudinal section views of a housing insert receiving an optical fiber terminal insertably thereinto during assembly, and of corresponding optical fiber terminals mating during connector mating.
Figure 9:
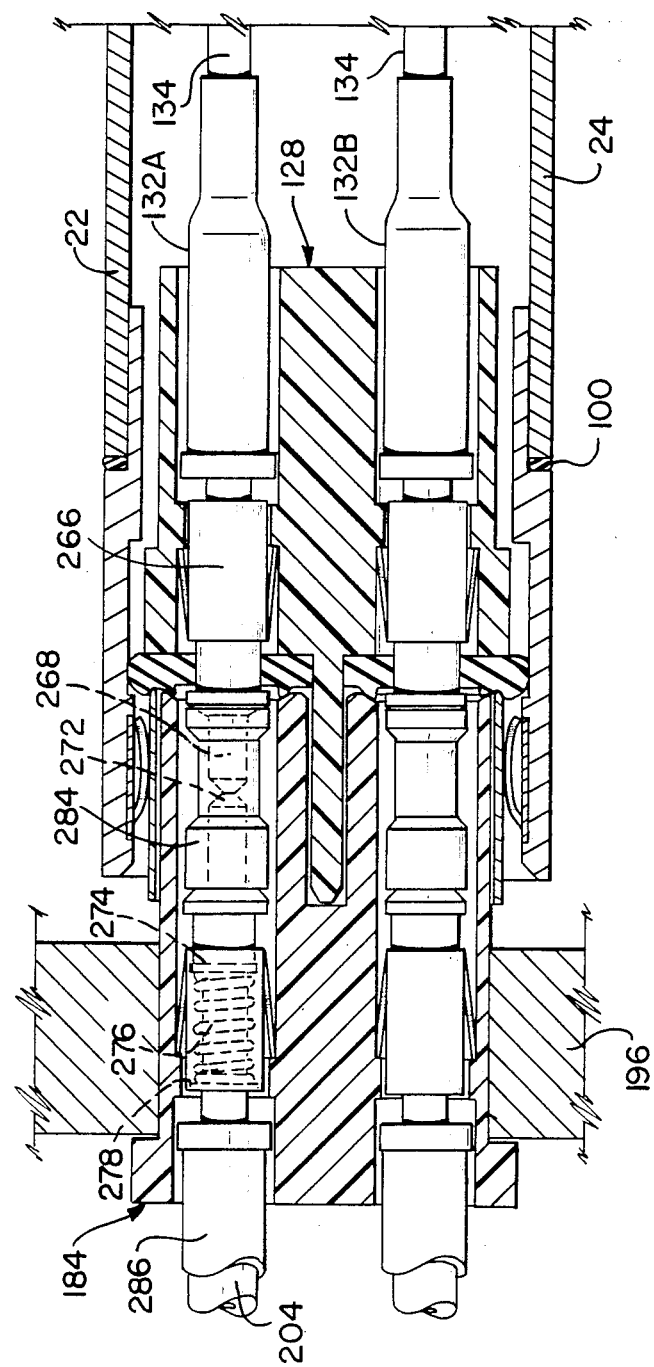
Figure 10:
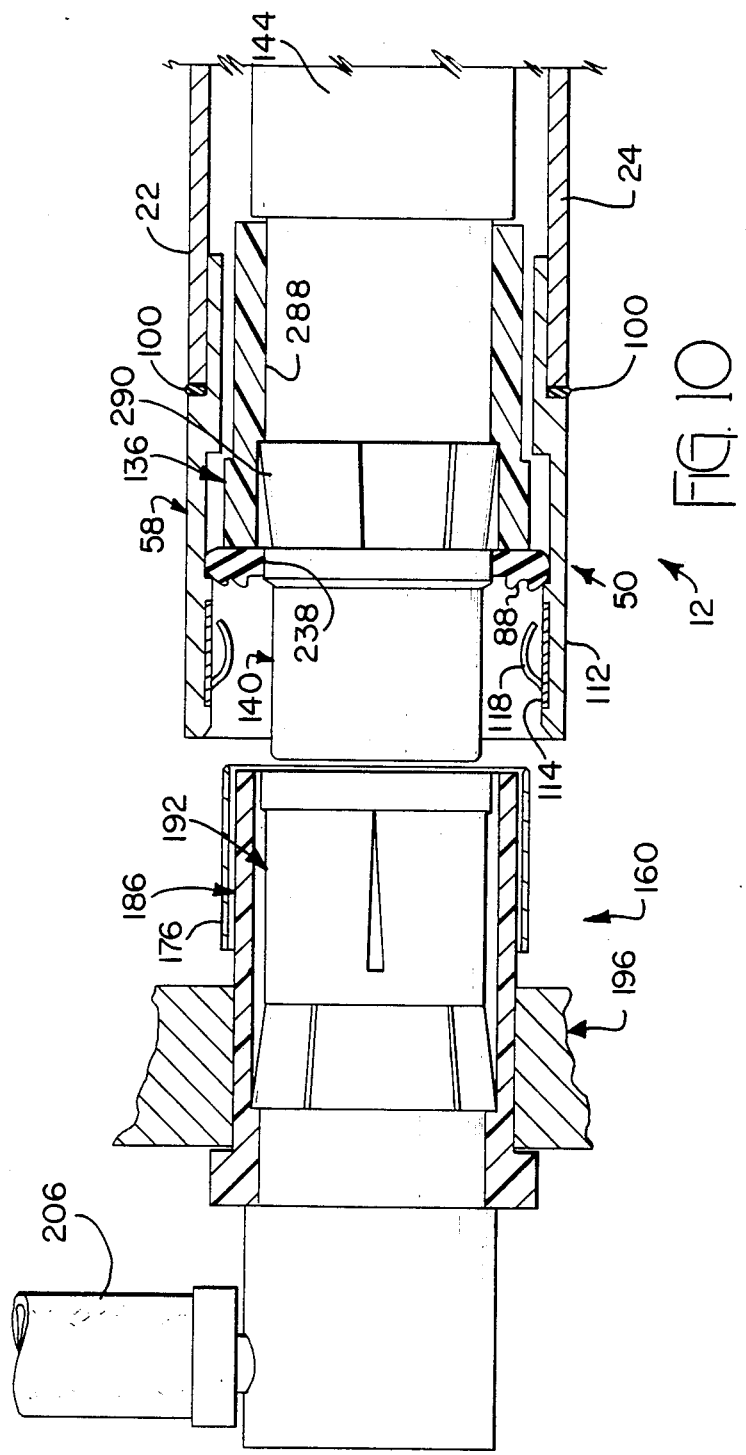
FIGS. 10 and 11 are longitudinal section views of housing inserts having respectively a coaxial signal terminal and a power terminals secured therein after assembly.
Figure 11:
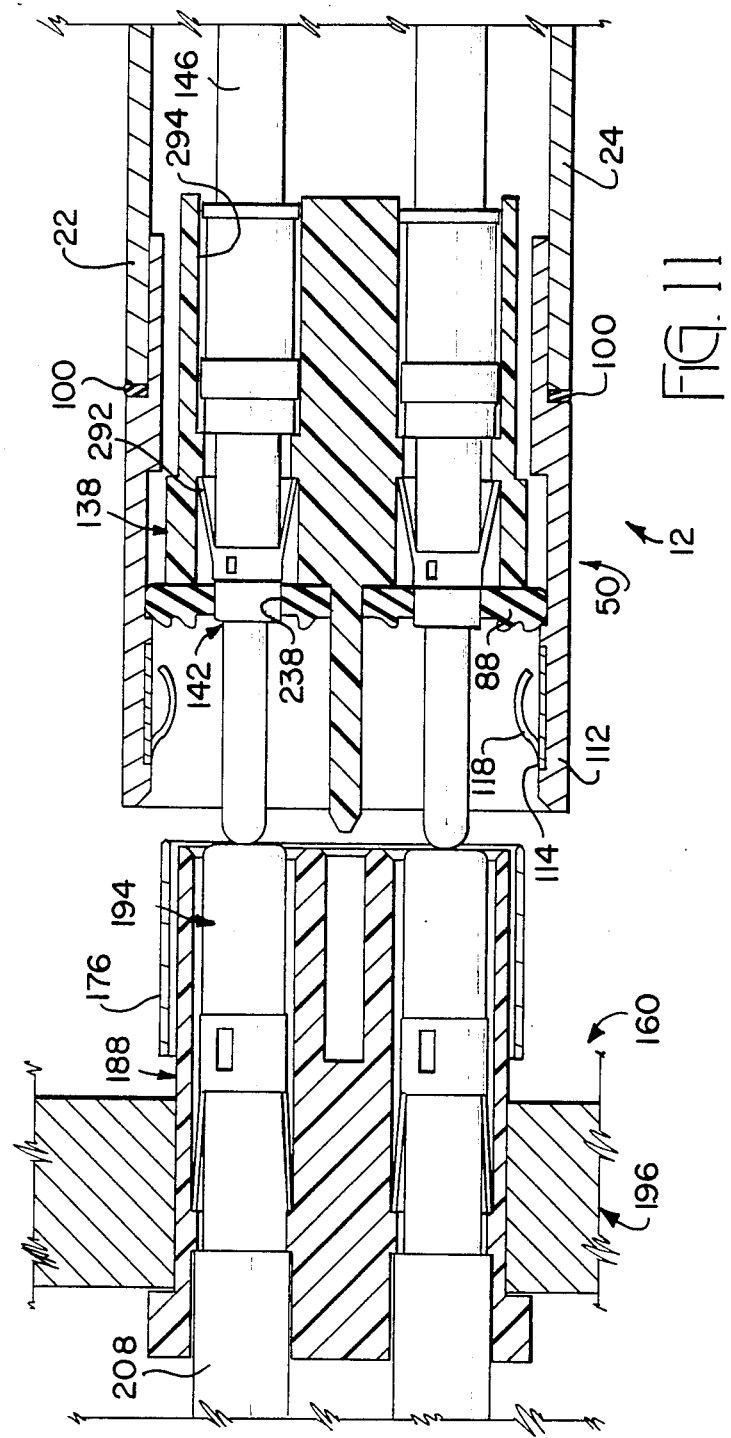

Also shown in phantom in FIG. 3 and in greater detail in FIG. 7 through 9, is a representative premolded housing insert 128 having terminal-receiving passageways 130 within which are securable terminal assemblies 132 for optical fiber cable means 134, if such is desired in a particular LRM assembly; housing insert 128 for optical fiber terminal assemblies 132 is shown in more particularity in FIGS. 8 and 9. Alternatively similar housing inserts 136,138 as are shown in FIGS. 10 and 11 may be used for terminals 140,142 of the coaxial cable means 144 or power cable means 146. Such a housing insert 128,136,138 is placed at an end laterally of key section 126 of forward housing 80 within metal shroud 58, and such housing inserts may be placed at both ends of forward housing 80, if desired. Housing inserts 128,136,138 may be secured to heat sink plate 30 in a manner similar to that for forward housing 80, by mounting ears 150 having holes 152 through which extend roll pins; for convenience mounting ears 102 of forward housing 80 at each end, and mounting ears 150 of each housing insert therebeside, should overlap so that their respective holes 152,104 are aligned to receive a common roll pin 110 (FIG. 3A) therethrough. Each such housing answer should have a separate alignment means such as an alignment rib 154, to align with a cooperating alignment means of a corresponding housing insert 184,186,188 of mother board connector 160. Facing surfaces 156,158 of forward housing 80 and housing inserts 128,136,138 preferably are spaced a slight distance apart.

Connector assembly 160 in FIGS. 3 and 4 is secured in the black box to be mated with LRM connector 50; while only part of the connector assembly is actually mounted and electrically connected to the mother board 20 within the black box, it will be referred to herein as the mother board connector. Mother board connector 160 includes a housing means 162 preferably including a rear dielectric insert member 164 through which body sections 166 of terminals 168 are force fit, and dielectric forward housing member 170 having passageways 172 into which receptacle contact sections 174 of terminals 168 are secured. Mother board connector 160 includes therearound metal shroud 176 for EMI shielding upon mating of the connectors by means of engagement of outer surfaces 178 thereof by EMI spring fingers 118 of metal shroud of LRM connector 50. Metal shroud 176 is grounded such as by connection by legs 180 inserted into holes 182 of mother board 20 and electrical connection with ground path means thereof, which completes the grounding of metal shroud 176 and of LRM assembly 12.

Mother board connector 160 additionally includes as shown in FIGS. 8 to 11, housing inserts 184,186,188 for optical fiber, coaxial or triaxial signal and power terminals 190, 192, 194 to correspond with housing inserts 128,136,138 of LRM connector 50. Each housing insert is mounted to framework 196 within black box 10 beside mother board 20, such as by screws 198 extending through mounting holes 200 of mounting flanges 202 of the insert and into threaded holes of framework 196. The housing insert receives terminals 190,192,194 terminated to cable means 204,206,208 for optical fiber, coaxial or triaxial signal and power transmission respectively; this arrangement permits mother board 20 to be removed from black box 10 without affecting housing inserts 184,186,188 or cable means 204,206,208. Housing inserts 184,186,188 are contained within integral metal shroud 176, although not secured to nor fit tightly against the metal shroud or rear or forward housing members 164,170.

Pin contact sections 210 at rearward ends of terminals 168 of mother board connector 160 are inserted through holes 212 of mother board 20 and secured and electrically connected to circuit paths thereof such as by soldering. Mating face 214 of forward housing 170 includes lead-ins 216 to passageways 172 to guide respective pin contact sections 62 of LRM connector 50 upon mating. Receptacle contact sections 174 are preferably the box type disclosed in U.S. Pat. No. 3,404.367. Terminals 168 may be stamped and formed from beryllium copper alloy with pin contact sections 210 plated with tin/lead for soldering to circuit paths of mother board 20, while the contact sections within the box receptacle sections may be plated gold over nickel.

Alignment recess 218 of forward housing 170 preferably includes chamfered corners 220 which cooperate with tapered forward edges 222 of alignment rib 154 for lead-in benefits upon its entering into recess 218 during connector mating; tapered edges 220,222 are bearing surfaces to urge rib 120 incrementally laterally in the transverse plane to become accurately aligned with recess 218. Each housing insert has a separate alignment means which may also be a recess similar to recess 218. This alignment process urges the terminal-containing housings of the LRM connector incrementally transversely to assure that pin contact sections 62 thereof and the optical fiber plug terminal assemblies 132, coaxial 140 or triaxial and power 142 terminals thereof are aligned with respective corresponding terminals of the mother board connector for proper mating engagement therewith upon full mating of the connectors.

In accordance with the present invention, LRM connector 50 is secured to LRM assembly 12 in a manner permitting incremental movement or floating transversely with respect thereto. More precisely, housing inserts 128,136,138 float within metal shroud 58 separately from forward housing 80, responsive to the position and orientation of corresponding housing inserts 184,186,188 of mother board connector 160. With reference to FIG. 4, such incremental float is permitted by means of gap or spacing 224 peripherally around forward housing 80 and housing inserts 128,136,138 provided by peripheral recess 226 into inside surface 116 of metal shroud 58. Also, referring to FIG. 3A, it is preferred that roll pin holes 104,152 through mounting ears 102,150 of forward housing 80 and housing inserts 128,136,138 be slightly larger than the diameter of roll pins 110 therein to permit at least sideways incremental movement of mounting ears 104,150 with respect to heat sink plate 30 and metal shroud 58, and also that mounting ear surfaces 228 be formed such that they are spaced slightly from heat sink plate 30 and from metal shroud 58. Further, consistent with the ability of the LRM connector of the present invention to be moved incrementally, elongate cantilever beams 64,66 of terminals 52,54 are resilient enough to flex and not transmit undue stress on the solder joints 230 with the circuit paths 42. The inside dimension of metal shroud 58 is selected to be larger than the outer dimension of metal shroud 176 to permit for slight misalignment of the metal shrouds upon mating engagement, due to each being mounted possibly off-center with respect to each other, and EMI spring fingers 118 are adapted to engage metal shroud 176 for grounding peripherally therearound in such a situation. Terminals 52,54 of LRM connector 50 and terminals 168 of mother board connector 160 are preferably formed having reduced length over conventional such terminals, to maintain a minimal distance between the connections with circuit cards 38, 40 and mother board 20, to reduce electrical impedances and to improve transmission of electrical signals therealong.

Seal member 88 is preferably premolded as an integral article from elastomeric material such as preferably heat resistant fluorosilicone rubber with apertures 232 through which pin contact sections 62 will extend; apertures 234 through which keys 122 will extend; aperture 236 through which alignment rib 154 will extend; and apertures 238 through which forward sections of optical fiber terminal assemblies, coaxial 140 or triaxial signal terminals, or power terminals 142 will extend. A preferably continuous rounded peripheral edge section 240 sealingly engages metal shroud 58 under compression when assembled therewithin behind rearwardly facing shoulder 242 thereof defining the forward end of peripheral recess 226. With seal member 88 being made of elastomeric material, sealing engagement is maintained with metal shroud 58 peripherally therearound both before and after any incremental movement of forward housing 80 or either of the two housing inserts contained in LRM connector 50 or all of them, during alignment upon mating even though the local compressive forces on portions of rounded seal edge section 240 are slightly modified.

Referring especially to FIGS. 5 and 6, terminals 52,54 of LRM connector 50 are preferably stamped and formed of phosphor bronze alloy with contact sections 68,70 plated gold over nickel. Elongate arcuate cantilever beams 64,66 extend rearwardly to free ends 72,74 from body sections 60, and contact sections 68,70 are disposed on card-proximate surfaces of free ends 72,74. Contact sections 68,70 are preferably convex relative to circuit paths 42 with which they will be joined, to facilitate filleting during soldering to circuit paths 42 which is known to result in the formation of strong joints 230. Terminals 52,54 are disposed in two arrays, one for each side 26,28 of heat sink plate 30 which may contain one or two circuit cards 38,40. Prior to contact sections 68,70 being soldered to the circuit paths 42, each of the two arrays is insert molded in a separate dielectric housing block 76,78 such as of polyphenylene sulfide, thus forming a pair of terminal subassemblies 244,246 which greatly facilitates handling and assembly. Body sections 60 of terminals 52,54 within blocks 76,78 are arranged in inner and outer rows so that pin contact sections 62 forwardly thereof are disposed in inner and outer rows to mate with a corresponding pattern of box receptacle contact sections 174 of mother board connector 160; appropriate tooling holds the pin contact sections 62 precisely in position and alignment during molding, as is known.

To assure that contact sections 68,70 on free ends 72,74 of terminals 52,54 of each array are maintained in a common plane to be joined to corresponding circuit paths 42 of circuit cards 38,40, and more importantly to assure that free ends 72,74 are fixed in precise centerline spacing 0.025 inches apart to correspond to the circuit path spacing, it is preferred that free ends 72,74 of terminals 52,54 remain joined to the carrier strip 248 or 250 from the metal strip which they were stamped, until after soldering to circuit paths 42 at which time carrier strips 248,250 are carefully severed such as by snipping with an appropriate tool (not shown) or by being broken off at frangible links.

It is preferred that each row of terminals 52 and 54 be stamped on a separate carrier strip 248 or 250 with centerlines of free ends 72 and 74 spaced 0.050 inches apart, because the shapes of the arcuate cantilever beams 64 and 66 are slightly different and the length thereof is different between the inner and outer row terminals 52,54. Forming of the terminal subassemblies holding the terminals in a two row array while the free ends are joined to the carrier strips, maintains alternating free ends 72,74 spaced on centerlines 0.025 inches apart. The two carrier strips 248 and 250 may be optionally bonded together such as by welding to further assure such spacing. By maintaining the carrier strips on the free ends of the terminals until soldering, the need is eliminated for expensive tooling otherwise needed to be applied to such a connector to bring the free ends into proper alignment and spacing when soldering is to be performed.

Referring now to FIG. 7, terminal subassemblies 244,246 have been secured to heat sink plate 30 by contact sections 68,70 being soldered to circuit paths 42; the structure so formed should be held in appropriate tooling (not shown) during the remaining assembly procedure. Terminal subassemblies 244,246 formed by molding blocks 76,78 to the terminal arrays maintain the pin contact sections 62 in desired spacing and alignment to facilitate securing forward housing 80 thereto. Preferably forward housing 80 and seal member 88 are mounted within metal shroud 58 already having EMI spring strip 114 secured therein, to form a forward connector subassembly 252. Forward connector subassembly 252 is moved along pin contact sections 62 after contact sections 68,70 have been soldered to circuit paths 42 until blocks 76,78 of terminal subassemblies 244,246 are fully seated within large cavity 254 of forward housing 80 and holes 106,104 through rearward flange 94 of metal shroud 58 and mounting ears 102 are aligned with holes 108 through heat sink plate 30 and roll pins 110 are inserted through the aligned holes. A bead 100 of silicone rubber sealant, or of conductive epoxy, is disposed around rearward flange 94. Finally, as seen in FIG. 2, cover plates 22,24 may then be placed in position with the plurality of holes 260 aligned with holes 262 through heat sink plate 30 and forward ends 264 thereof overlapping rearward flange 94 of metal shroud 58, and are fastened to heat sink plate 30 and now-assembled LRM connector 50 such as with bolts or rivets 34, completing the LRM assembly 12.

FIG. 8 shows housing insert 128 having passageways 130 for optical fiber terminal assemblies 132, which are inserted and secured therein when forward connector subassembly 252 is being secured to the terminal subassemblies 244,246 and heat sink plate 30 (FIG. 7). Housing insert 128 may be of plastic such as polyphenylene sulfide or it may be metal. A first optical fiber terminal assembly 132A disposed in passageway 130A has been secured to an end of a length of optical fiber cable 134, the other end of which has been appropriately secured in an optically mated connection with an appropriate photoelectric device such as a light emitting or a light receiving diode (not shown), as is known. A second such terminal assembly 132B is being inserted into corresponding passageway 130B of housing insert 128 and secured therein by retention clip 266. Plug terminal 268 of terminal assembly 132A extends through aperture 238 of seal member 88 and includes annular collar 270 disposed therealong to be located in front of seal member 88, stretching the seal aperture temporarily until it passes therethrough. It is desired that in mother board connector 160, mating optical fiber terminal assembly 190 be mounted in housing insert 184 in such a way that plug terminal 272 and the end portion of the optical fiber transmission member secured within it, is able to be moved rearwardly with annular collar 274 thereof engaging against compression spring 276, all shown in phantom. Compression spring 276 is compressed and is stopped by a flange 278 of retention clip 280 secured in passageway 282, upon mating of plug terminal 272 with corresponding optical fiber plug terminal 268 in the corresponding housing insert of LRM connector 50. This spring biasing of the mating plug terminals together within an appropriate alignment sleeve 284 assures that the optical end faces of the mated optical fiber transmission members abut without a gap; the alignment sleeve fitting firmly around both plug terminals 272,268 assures that the mating plug terminals and the end lengths of optical fibers therewithin are precisely axially aligned; both assure optical signal transmission between the optical fiber transmission members without loss of optical signal. Regarding cable means 204 for optical fiber terminal assembly 190 in mother board connector 160, it is preferred to assure a gradual bending of the cable means which contains a delicate fiber therewithin, to prevent breaking but also to protect against signal loss due to too sharp a bend; therefore, cable means 204 should be contained in metal tube 286 extending from the rearward end of terminal assembly 190 and curving to gradually bend the cable about a 90 degree angle to eventually extend parallel to the bottom of the black box.

FIG. 10 shows coaxial signal terminal 140 terminated to an end of a length of coaxial cable 144 and secured within passageway 288 of housing insert 138 by a retention clip 290, and within aperture 238 of seal member 88 of LRM connector 50. Generally a coaxial terminal presently commercially available today is large enough for only one to be secured in a housing insert restricted in dimension by the confines of the desired LRM assembly. While no alignment rib is possible with housing insert 136, the mating coaxial terminals 140,192 themselves have corresponding lead-in features for entering into mating engagement by aligning themselves which the alignable housing insert 136 of LRM connector 50 permits. The other end of coaxial cable 144 is appropriately terminated by a coaxial connector (not shown) electrically connected to circuit card 38 or 40. Optionally a triaxial signal terminal for a triaxial cable means may also be used if desired.

Similarly, FIG. 11 shows power terminal 142 terminated to an end of a length of power cable 146 and secured by retention clip 292 within passageway 294 of housing insert 138 and aperture 238 of seal member 88 of LRM connector 50, with the other end of power cable 146 appropriately electrically connected to circuit card 38 or 40, which can thereby transmit electrical power such as at a level of 10 amperes or so for certain components within the LRM upon mating with a corresponding power terminal 194 of mother board connector 160.

Figure 12:
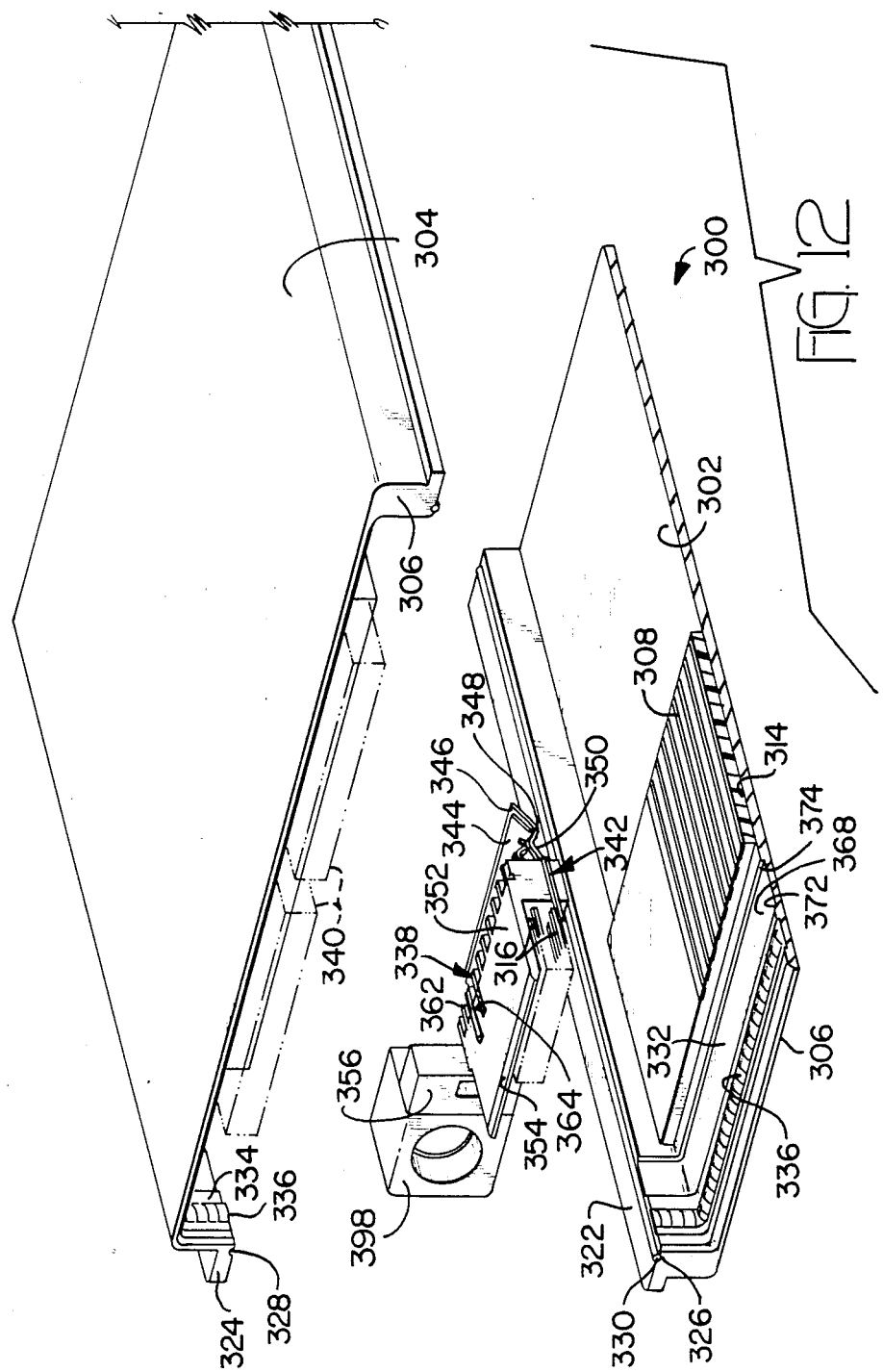
FIG. 12 is a part perspective view of a second embodiment of LRM assembly consisting of two opposing heat sink covers with a terminal subassembly exploded from one of them and terminal subassemblies of the other in phantom.
Figure 13:
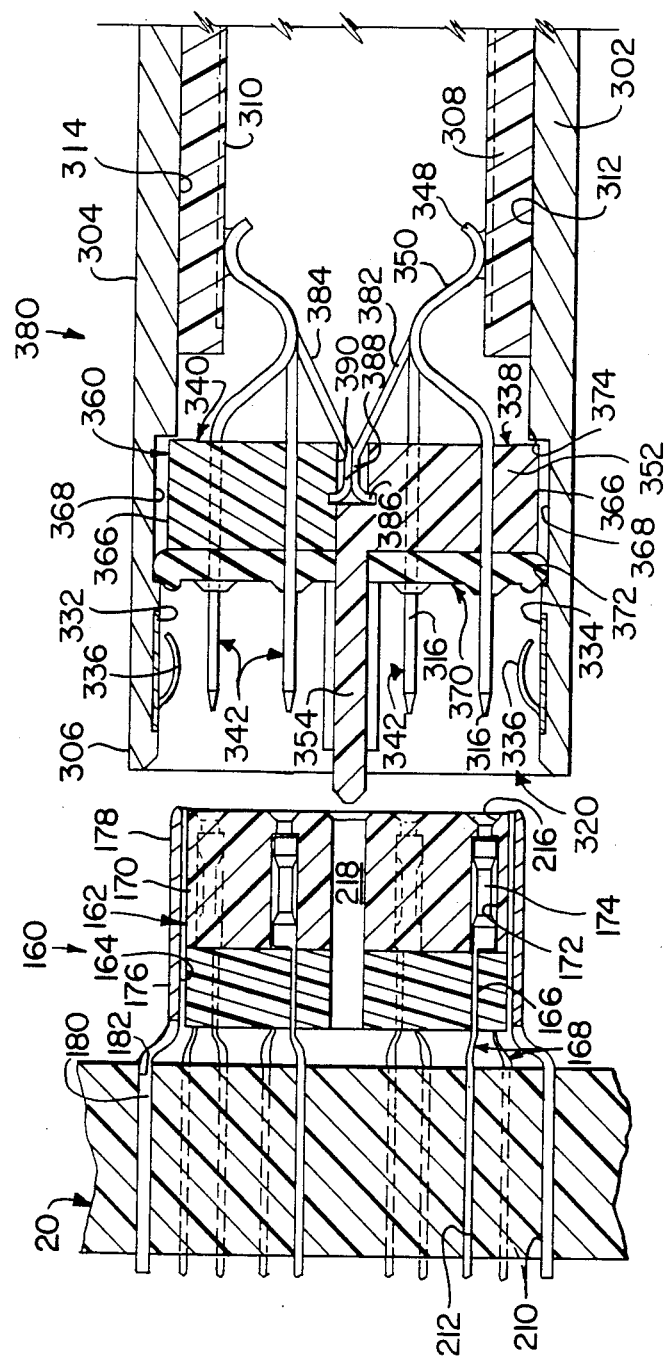
FIGS. 13 and 14 are, respectively, a longitudinal section view and part section perspective view of a mounted LRM connector of FIG. 12 aligned to mate with a mother board connector of FIG. 4.
Figure 14:
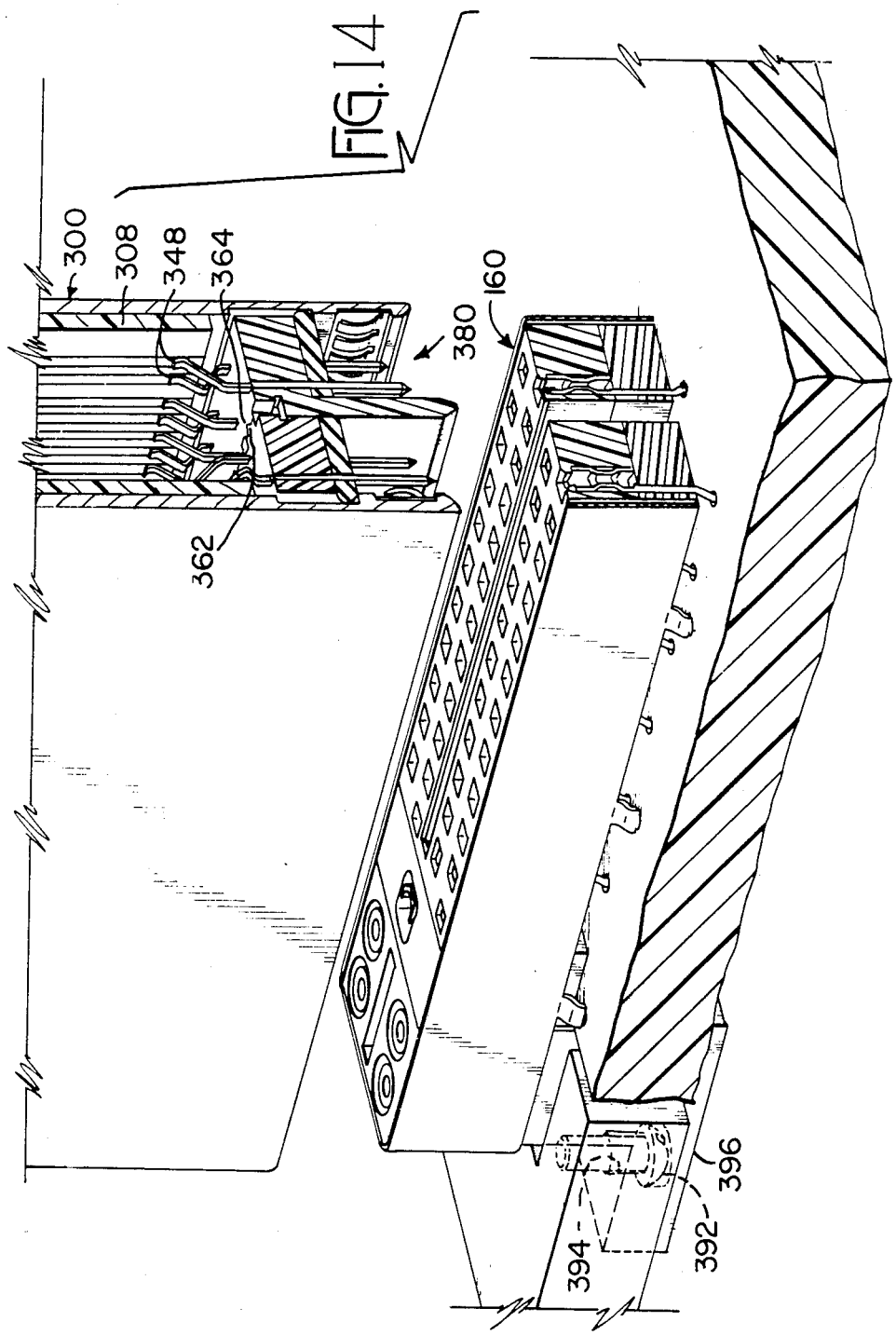

A second, preferred embodiment of the present invention is shown in FIGS. 12, 13 and 14. A different embodiment of LRM 300 is utilized comprising a pair of cover plates 302,304 such as of anodized aluminum which constitute the heat sink means of the LRM assembly. Near forward ends 306 thereof, circuit cards 308,310 are disposed securely on inside surfaces 312,314. Forward ends 306 of the two cover plates comprise the metal shroud for pin contact sections 316 of LRM connector 320, eliminating the separate metal shroud of the LRM connector 50 of the first embodiment. The elimination of the separate metal shroud also eliminates the necessity of sealing the joint between it and the cover plates of LRM 12 of FIG. 2, and also eliminates the possibility of any discontinuity in the shielding the LRM assembly against EMI possible at such a joint. It is preferred that peripheral mounting flanges 322,324 of cover plates 302,304 include opposed continuous grooves 326,328 within which is disposed an O-ring 330 of for example heat resistant fluorosilicone rubber which will seal the peripheral joint between the cover plates 302,304 when they are fastened together. Disposed around the interior surface 332,334 at the forward end of each cover plate 302,304 is an EMI spring strip 336; strips 336 together surround and engage the metal shroud of a mother board connector upon mating which could be identical to mother board connector 160 of FIG. 4 above.

Terminal subassemblies 338,340 of terminals 342 are formed with bonded carrier strips 344,346 attached to free ends 348 of cantilever beams 350 until after soldering, as described hereinabove with respect to FIGS. 5 and 6. However, LRM assembly 300 eliminates the need for a forward housing member. Housing 352 of one of the pair of terminal subassemblies 338 molded to a two row array of terminals 342 associated with circuit card 308 of cover plate 302, can include alignment rib 354 and can also include at the ends thereof housing portions 356 for keys 358. Each of housings 352 and 360 of the pair of terminal subassemblies 338,340 can include one or more diamond-shaped projections 362 which enter correspondingly shaped grooves 364 of the other when the subassemblies have been mounted and the cover plates brought together for fastening, thus aligning the two arrays of pin contact sections 316 for mating with the receptacle contact sections 174 of mother board connector 160. Cover-proximate sides 366 of housings 352,360 preferably are dimensioned to be, or have portions formed to be, disposed within recesses 368 of respective cover plates 302,304 after cover plates 302,304 are fastened together and integral seal member 370 urged into place from forwardly thereof so that forward and rearward ends 372,374 of the recesses 368 define stop surfaces preventing significant axially rearward and forward movement of LRM connector housings 352,360 during mating and unmating respectively with mother board connector 160.

Referring to FIG. 13, LRM connector assembly 380 can provide for direct electrical connection between a selected pair of opposed circuit paths of the opposed cards 308,310. One or more corresponding spring contacts 382,384 of each terminal subassembly 338,340 may be formed on carrier strip at a location not requiring a terminal, and each spring contact 382,384 has a card-remote free end 386 extending toward that of the opposing spring contact. The card-remote free end is generally convex with a flat contact portion 388 to electrically engage the other spring contact. Each of the molded housings 352,360 includes a corresponding channel 390 into which the respective free end 386 will be received and secured after being deflected under spring force upon being engaged by the free end of the opposing spring contact. Spring contacts 382,384 should be formed to extend slightly outwardly from housing channel 390 prior to complete assembly to assure engagement with the opposing spring contact and the generation of sufficient contact normal force.

Optional housing inserts are useful as with LRM connector of FIGS. 3 and 4, to provide for optical fiber terminal assemblies, coaxial or triaxial signal terminals and power terminals. As before, they may be separate members in the LRM connector separately alignable upon mating. It is possible, however, to float mount the housing inserts of the mother board connector by extending fastener 392 through an enlarged diameter mounting hole 394 through mounting flange 396, and then fixedly mount the housing inserts of the LRM connector to one or the other of the pair of cover plate assemblies. Then it is possible to mold housing insert portions 398 (FIG. 12) of the LRM connector as part of the terminal subassemblies, forming integral housings and simplifying assembly of the LRM connector even further.

Advantages of the second embodiment are several. Elimination of the central heat sink plate member creates unencumbered space between cover plates for the use of components not so restricted in size as with LRM assembly of FIG. 2, and similarly more space for various lengths of cable means for optical signal transmission, coaxial or triaxial signal transmission and power transmission to components within the LRM assembly. Thickening of cover plates is possible without increasing the weight of the LRM assembly, improving their functioning as heat sinks. Better sealing is possible between the cover plate joints, and better EMI shielding also results as aforesaid. If one of the pair of cover plates is damaged or ruined, or the connector half secured thereto, the other cover plate can be reused which is especially important considering the value of the circuit card and components secured thereto.

Other variations in the structure and method of assembly of the LRM connector assemblies of the present invention may be made which are within the spirit of the invention and the scope of the claims.

What is claimed is:

1. A method of assembling an electrical connector to an end of an LRM having cover means fastened together as a unit and shielded, the LRM including a pair of daughter cards mounted to heat sink means of the LRM, each daughter card having circuit paths on one side thereof to which respective arrays of terminals of the connector are to be joined, comprising the steps of:

stamping and forming two arrays of terminals, each array comprising a plurality of contact terminals joined to a carrier strip at severable locations, each said contact terminal including a first contact section proximate said severable section for being joined to a respective circuit path of a daughter card associated with the array, said first contact section being defined on an end of an elongate cantilever beam portion of said contact terminal, and further including a second contact section remote and forwardly from said elongate cantilever beam portion for electrical engagement with a corresponding contact means of an electrical article, each said contact terminal further including a body section between said elongate cantilever beam portion and said second contact section, said second contact sections of said plurality of contact terminals of each said array having been formed to define a respective preselected arrangement whereby said second contact sections are matable with a like arrangement of said corresponding contact means of said electrical article, said elongate cantilever beam portions being adapted to flex during connector mating;

securing said body sections of said contact terminals of said arrays within respective dielectric housing means forming respective terminal subassemblies, said housing means holding said second contact sections of said contact terminals in said preselected arrangements and said carrier strips firmly holding said first contact sections thereof spaced apart preselected distances in respective planar arrays, with said elongate cantilever beam portions permitting the thus-housing body sections incremental movement with respect to said first contact portions;

joining said first contact sections held spaced apart along said planar arrays by said carrier strips to said respective circuit paths of said respective daughter cards;

severing said carrier strips from said contact terminals at said severable sections after said joining;

joining together said respective housing means, defining a connector having a mating face along said second contact sections; and securing cover means thereover, defining a module, whereby a method is defined of securing to a pair of daughter cards of a module, a connector movable incrementally with respect thereto.

2. The method of claim 1 further comprising securing a sealing means along exposed surfaces of said mating face of said respective joined housing means.

3. The method of claim 2 wherein said carrier strips include associated spring contacts extending therefrom having respective first contact sections in common alignment with said first contact sections of said first contact terminals and joined to respective circuit paths of the daughter cards, said spring contacts including spring arms extending toward and to each other as said terminal subassemblies are assembled together, said spring arms having second contact sections thereon to engage each other under spring bias to define an electrical connection therebetween, whereby an electrical connection is established between said respective circuit paths of the opposing daughter cards.

4. The method of claim 2 wherein said array of contact terminals associated with respective said circuit paths of each respective one of said daughter cards having said second contact sections arranged in two rows parallel to the circuit path surface of a said daughter card, the contact terminals of an inner one of said rows alternating with the contact terminals of an outer one of said rows, said inner row contact terminals being stamped and formed integrally joined to a respective carrier strip and said outer row contact terminals being stamped and formed integrally joined to an other respective carrier strip, said carrier strips being maintained together in a manner maintaining in common alignment and appropriately spaced said first contact sections of said inner row and said outer row contact terminals to be joined to respective said circuit paths without alignment tool means after said body sections of said inner row and outer row contact terminals have been secured in a common said housing means, said common housing means thereby by maintaining said second contact sections of said inner row and outer row contact terminals aligned and appropriately spaced in two rows.

5. The method of claim 4 including the further step of bonding said carrier strips together prior to said step of joining said first contact sections to said respective circuit paths.

6. The method of claim 4 further including the step of securing said housing means of both said terminal subassemblies within a forward housing member having passageways through which extend respective said second contact sections.

7. The method of claim 1 wherein at least one of said housing means and said like housing means includes an integral alignment rib extending forwardly from a mating face thereof.

8. The method of claim 1 wherein at least one of said housing means and said like housing means includes at least one passageway in which is securable a key member to enable appropriate keyed mating with a mating electrical connector.

9. The method of claim 1 wherein at least one of said housing means includes at least one passageway in which is securable a respective additional terminal terminated to a corresponding transmission member of a corresponding cable means.

10. A method of fabricating an assembly of a housed array of electrical contact terminals of an electrical connector to a surface of a circuit panel means having conductive pads therealong, each contact terminal including a first contact section connected to a respective conductive pad and extending to a body section and a second contact section remote from the first contact section for connection to a corresponding electrical contact means of another electrical article, comprising the steps of:
stamping and forming at least a first row of contact terminals joined to a first carrier strip at severable sections, said stamping and forming step being performed to result in said first contact section of each said terminal being defined on an end of an elongate cantilever beam portion proximate a severable section at a respective said carrier strip, so that after full assembly said terminals include said first contact sections on portions which are adapted to flex during connector mating and minimize stress on the solder joints thereof to respective said conductive pads upon incremental movement of the resultant connector with respect to the circuit panel means during connector mating;
securing said body sections of said row of contact terminals within a common dielectric housing means forming a terminal subassembly, said housing means holding said second contact sections of said row of contact terminals in said preselected arrangement and defining a housed terminal array having a row of elongate cantilever beam portions extending therefrom, and said first carrier strip firmly holding said first contact sections spaced apart preselected distances in a common planar array, with said elongate cantilever beam portions permitting the thus-housed body sections incremental movement with respect to said first contact portions;
joining said first contact sections held spaced apart along said common planar array by said first carrier strip to said respective conductive pads on a common surface of said circuit panel means; and
severing said first carrier strip from said contact terminals at said severable sections after said joining step,
whereby a method is defined of securing to a circuit panel means a housed terminal array adapted to permit incremental connector movement with respect to the circuit panel means by means of elongate flexible cantilever beam terminal sections without requiring tool means for precisely spacing apart and aligning with corresponding conductive pads the respective first contact sections otherwise susceptible of misalignment during handling and joining.

11. A method of fabricating an assembly of a housed multi-row array of electrical contact terminals of an electrical connector to a surface of a circuit panel means having conductive pads therealong, each contact terminal including a first contact section connected to a respective conductive pad and extending to a body section and a second contact section remote from the first contact section for connection to a corresponding electrical contact means of another electrical article, comprising the steps of:
stamping and forming at least first and second rows of contact terminals joined to respective first and second carrier strips at severable sections, said first contact section of each said terminal being defined on an end of an elongate cantilever beam portion proximate a severable section at a respective said carrier strip, said stamping and forming step being performed to result in said first contact section of each said terminal being defined on an end of an elongate cantilever beam portion proximate a severable section at a respective said carrier strip, so that after full assembly said terminals include said first contact on portions which are adapted to flex during connector mating and minimize stress on the solder joints thereof to respective said conductive pads upon incremental movement of the resultant connector with respect to the circuit panel means during connector mating;

securing together said at least first and second carrier strips, defining a multi-row terminal array wherein said second contact sections define a preselected multi-row arrangement and said elongate cantilever beam portions extend rearwardly from said body portions in at least first and second rows to respective said severable sections at said secured-together carrier strips;

securing said body sections of said at least first and second rows of contact terminals within a common dielectric housing means forming a terminal subassembly, said housing means holding said second contact sections of said rows of contact terminals in said preselected arrangement and defining a housing multi-row terminal array having more than one row of elongate cantilever beam portions extending therefrom, and said at least first and second carrier strips firmly holding said first contact sections of said at least first and second rows of terminals spaced apart preselected distances in a common planar array;

joining said first contact sections of said at least first and second rows of terminals held spaced apart along said common planar array by said joined carrier strips, to said respective conductive pads on a common surface of said circuit panel means; and severing said secured-together carrier strips from said contact terminals simultaneously at said severable sections after said joining step, whereby a method is defined of securing to a circuit panel means a housed multi-row terminal array adapted to permit incremental connector movement with respect to the circuit panel means by means of elongate flexible cantilever beam terminal sections without requiring tool means for precisely spacing apart and aligning with corresponding conductive pads the respective first contact sections otherwise susceptible of misalignment during handling and joining.

* * * * *

UNITED STATES PATENT OFFICE
CERTIFICATE OF CORRECTION

Patent No. 4,903,402　　　　　　　　　Dated February 27, 1990

Inventor(s)　Jeffrey M. Norton et al.

It is certified that error appears in the above-identified patent and that said Letters Patent is hereby corrected as shown below:

In the Claims:

Claim 1, Column 14, Line 57 - the word "thus-housing" should be --thus-housed--.

Claim 3, Line 1 - "2" should be --1--.

Claim 4, Line 1 - "2" should be --1--.

Claim 11, Column 17, Line 8 - insert --sections-- after the word "contact".

Claim 11, Column 17, Line 27, to column 18, line 1 - "housing" should be --housed--.

Signed and Sealed this

Thirtieth Day of April, 1991

Attest:

HARRY F. MANBECK, JR.

*Attesting Officer*　　*Commissioner of Patents and Trademarks*